(12) United States Patent
Nakano

(10) Patent No.: US 12,466,424 B2
(45) Date of Patent: Nov. 11, 2025

(54) DRIVING SUPPORT DEVICE

(71) Applicant: TOYOTA JIDOSHA KABUSHIKI KAISHA, Toyota (JP)

(72) Inventor: Tomoyuki Nakano, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 163 days.

(21) Appl. No.: 18/468,806

(22) Filed: Sep. 18, 2023

(65) Prior Publication Data
US 2024/0199051 A1   Jun. 20, 2024

(30) Foreign Application Priority Data
Dec. 19, 2022   (JP) ................................ 2022-202313

(51) Int. Cl.
*B60W 50/14*   (2020.01)
*B60W 60/00*   (2020.01)

(52) U.S. Cl.
CPC .......... *B60W 50/14* (2013.01); *B60W 60/001* (2020.02); *B60W 2050/146* (2013.01); *B60W 2420/403* (2013.01); *B60W 2520/00* (2013.01)

(58) Field of Classification Search
CPC ............... B60W 50/14; B60W 60/001; B60W 2050/146; B60W 2420/403; B60W 2520/00
See application file for complete search history.

(56) References Cited

U.S. PATENT DOCUMENTS

| | | |
|---|---|---|
| 9,796,416 B2 | 10/2017 | Fujii et al. |
| 10,108,190 B2 | 10/2018 | Tomatsu et al. |
| 10,222,796 B2 | 3/2019 | Ichikawa et al. |
| 10,308,254 B2 | 6/2019 | Hirano et al. |
| 10,310,508 B2 | 6/2019 | Kunisa et al. |
| 10,393,255 B2 | 8/2019 | Nishimine |
| 10,520,939 B2 | 12/2019 | Sato et al. |
| 10,525,983 B2 | 1/2020 | Ichikawa et al. |
| 10,654,482 B2 | 5/2020 | Urano et al. |
| 10,895,875 B2 | 1/2021 | Hashimoto et al. |

FOREIGN PATENT DOCUMENTS

| | | | | |
|---|---|---|---|---|
| JP | 2018076012 A | * | 5/2018 | |
| JP | 2020042853 A | * | 3/2020 | ............ G01C 21/36 |

* cited by examiner

*Primary Examiner* — Vivek D Koppikar
*Assistant Examiner* — Jeffrey R Chalhoub
(74) *Attorney, Agent, or Firm* — SoraIP, Inc.

(57) ABSTRACT

The driving support device includes an image acquisition unit that acquires an image including an occupant riding on the vehicle, a state detection unit that detects a state of the occupant based on the image, and a notification unit that notifies the occupant when the detected state is a state in which the occupant holds the object in both hands for a predetermined time in a mode in which the vehicle does not need to grip the steering wheel of the vehicle and the vehicle is being automatically driven.

5 Claims, 3 Drawing Sheets

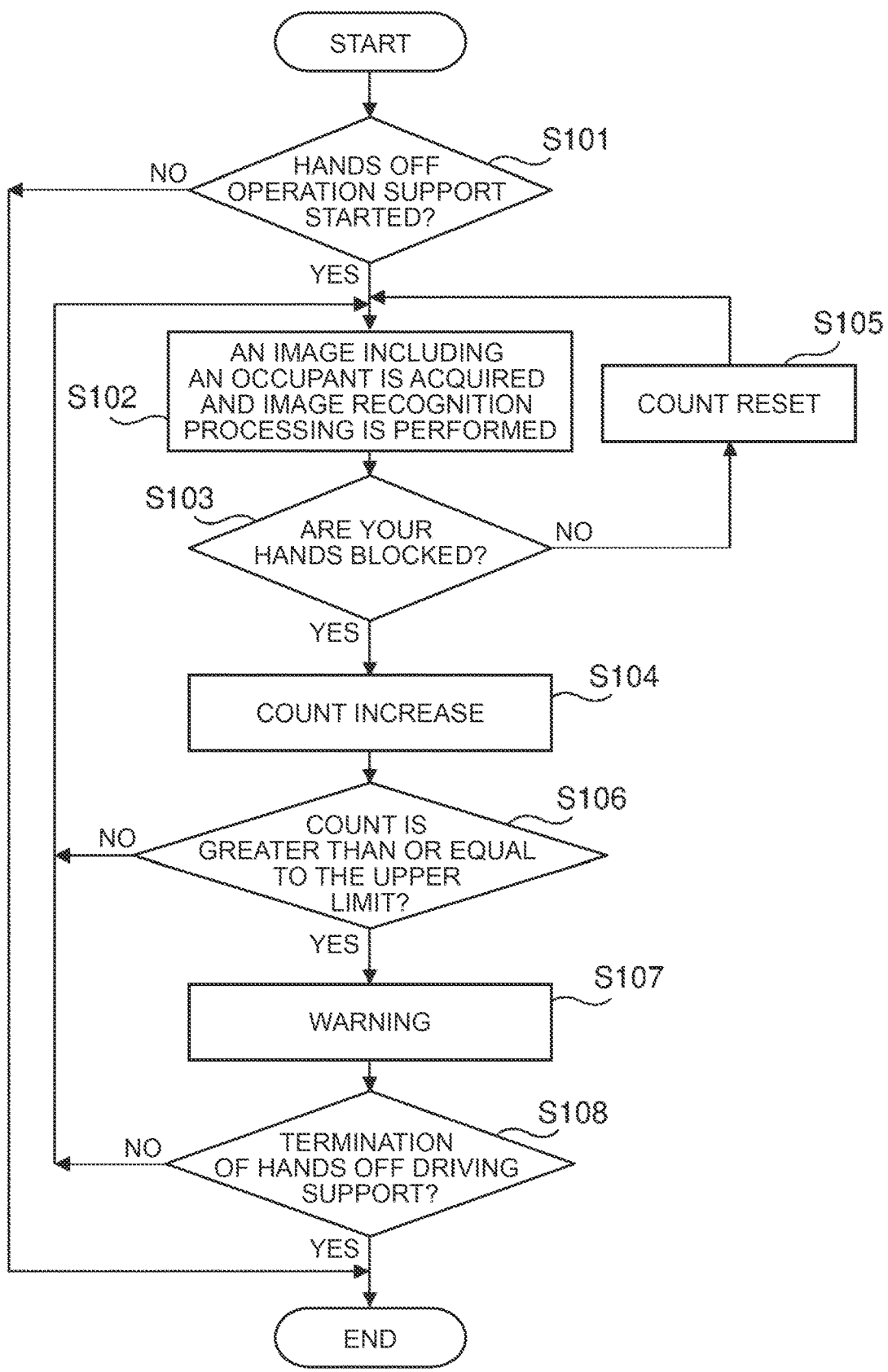

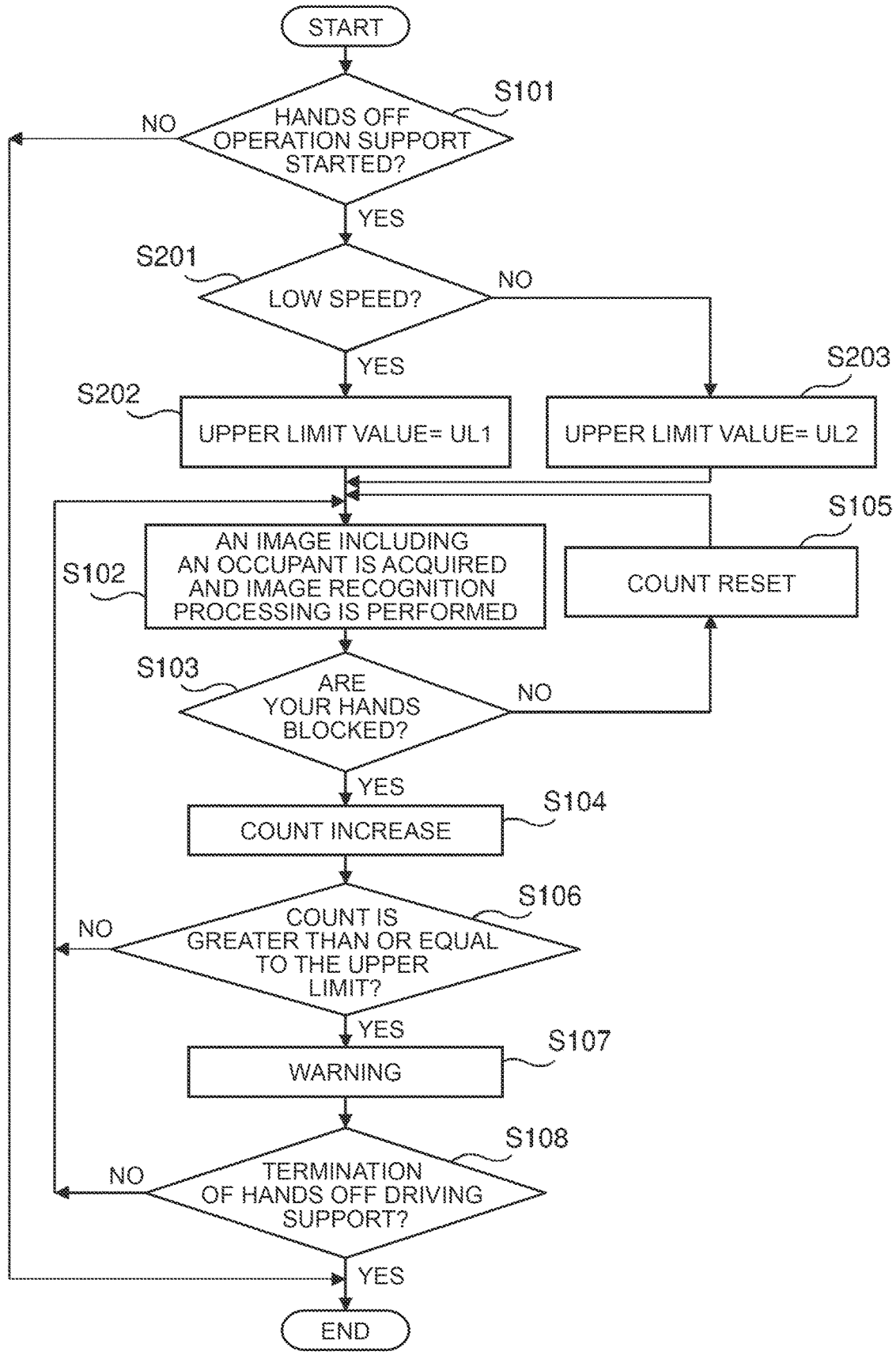

DRIVING SUPPORT DEVICE

CROSS-REFERENCE TO RELATED APPLICATION

This application claims priority to Japanese Patent Application No. 2022-202313 filed on Dec. 19, 2022, incorporated herein by reference in its entirety.

BACKGROUND

1. Technical Field

The present disclosure relates to a technical field of a driving support device.

2. Description of Related Art

As a device of this type, for example, a device has been proposed which notifies predetermined information when an autonomous driving control unit determines that there is no area in which an object possessed by an occupant of a vehicle can be placed while the autonomous driving is being executed in a mode in which gripping of a steering wheel of the vehicle is unnecessary (see Japanese Unexamined Patent Application Publication No. 2018-076012 (JP 2018-076012 A)).

SUMMARY

According to a technique described in JP 2018-076012 A, an occupant can continue to hold an object other than a steering wheel in both hands as long as there is an area where an object possessed by the occupant can be placed.

The present disclosure has been made in view of the above circumstances, and an object of the present disclosure is to provide a driving support device capable of suppressing, when necessary, occurrence of a situation in which gripping of the steering wheel by the occupant is delayed.

A driving support device according to an aspect of the present disclosure includes:
an image acquisition unit for acquiring an image including an occupant riding on a vehicle;
a state detection unit for detecting a state of the occupant based on the image; and
a notification unit for making a notification to the occupant when the vehicle is in a mode in which gripping of a steering wheel of the vehicle is not required, the vehicle is autonomously driven, and the detected state in which the occupant holds an object in both hands continues for a predetermined time.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 2 is a flowchart illustrating an operation of the driving support device according to the embodiment; and FIG. 3 is a flowchart illustrating an operation of a driving support device according to a modification of the embodiment.

DETAILED DESCRIPTION OF EMBODIMENTS

Figure 1:
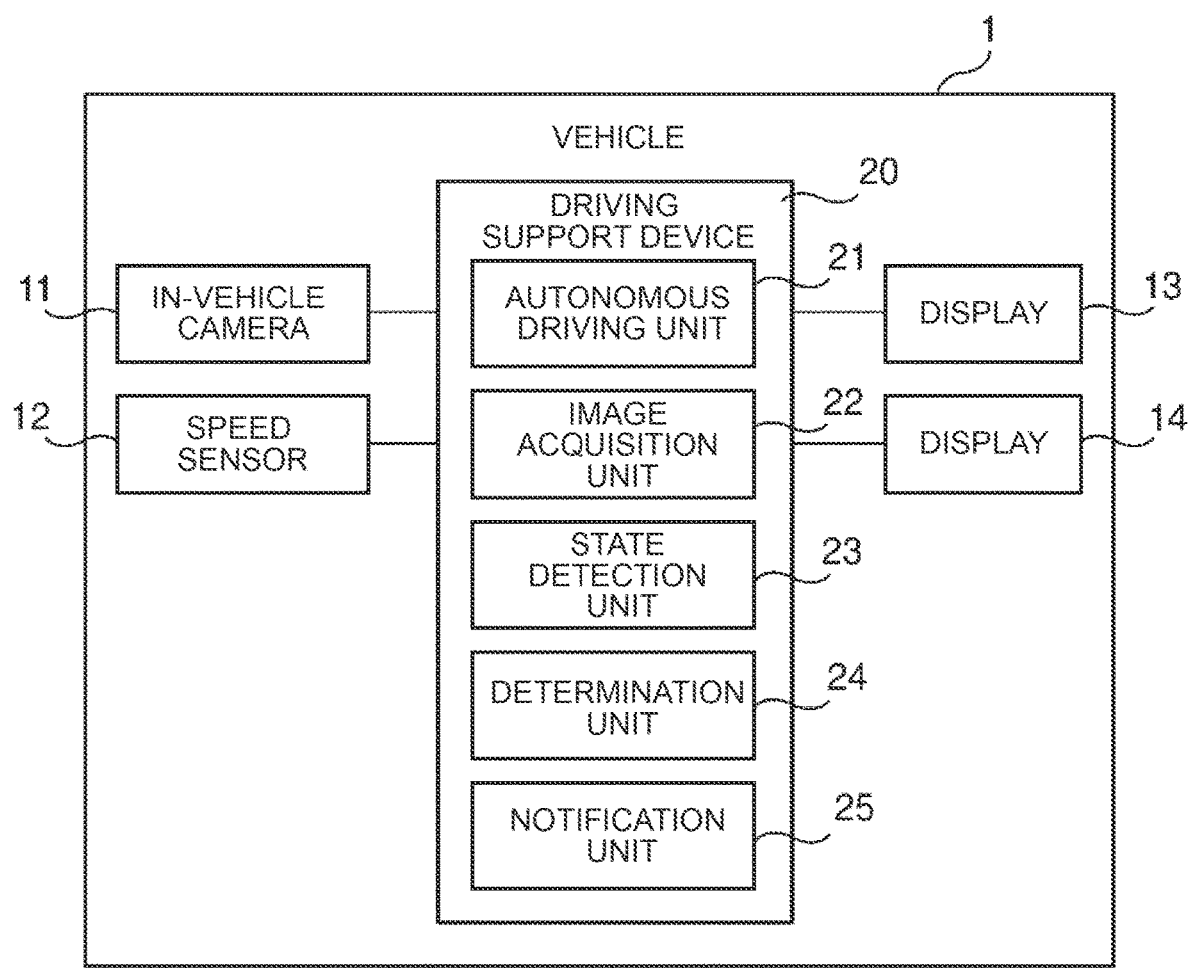
FIG. 1 is a block diagram illustrating a configuration of a driving support device according to an embodiment.

An embodiment of a driving support device will be described with reference to FIGS. 1 and 2. In FIG. 1, the vehicle 1 includes an in-vehicle camera 11, a speed sensor 12, displays 13 and 14, and a driving support device 20. The in-vehicle camera 11 is disposed in the vehicle interior so as to be able to capture an image of the vehicle cabin of the vehicle 1. One of the displays 13 and 14 may be a display arranged in an instrument panel of the vehicle 1. The other of the displays 13 and 14 may be a head-up display.

The driving support device 20 includes an autonomous driving unit 21, an image acquisition unit 22, a state detection unit 23, a determination unit 24, and a notification unit 25 as logical blocks that are logically realized or as a processing circuit that is physically realized.

The autonomous driving unit 21 can execute autonomous driving for automatically controlling at least one of acceleration/deceleration and steering of the vehicle 1. An example of a control process related to the automatic driving will be described below. However, the control processing related to the automatic driving is not limited to the processing described below. That is, various existing aspects can be applied to the control processing related to the automatic driving.

The autonomous driving unit 21 recognizes an object existing in the vicinity of the vehicle 1. For example, the autonomous driving unit 21 may recognize an object existing in the vicinity of the vehicle 1 based on at least one of an image captured by a camera capable of capturing an image of the periphery of the vehicle 1, an output of the radar sensor, and an output of Laser Imaging Detection and Ranging (LiDAR). The autonomous driving unit 21 acquires state information indicating a traveling state of the vehicle 1. For example, the autonomous driving unit 21 may acquire the state information from the output of various sensors (for example, the speed sensor 12) included in the vehicle 1. The traveling state of the vehicle 1 may include at least one of a speed, an acceleration, and a steering angle. The autonomous driving unit 21 acquires position information indicating the position of the vehicle 1. For example, the autonomous driving unit 21 may acquire position data using Global Navigation Satellite System (GNSS).

The autonomous driving unit 21 determines a route to a destination input by an occupant of the vehicle 1. For example, the autonomous driving unit 21 may determine the route to the destination based on the position information and the map information including the link and the node. The autonomous driving unit 21 determines a target trajectory on which the vehicle 1 will travel in the future based on the determined route and the object existing in the vicinity of the recognized vehicle 1. The autonomous driving unit 21 automatically controls at least one of acceleration/deceleration and steering of the vehicle 1 so that the vehicle 1 travels along the target trajectory based on the state information.

The autonomous driving unit 21 can execute, as the autonomous driving mode, a first autonomous driving mode in which the occupant of the vehicle 1 does not need to grip the steering wheel and a second autonomous driving mode in which the occupant of the vehicle 1 needs to grip the steering wheel. The autonomous driving unit 21 may select one of the first autonomous driving mode and the second autonomous driving mode based on the target trajectory. For example, when the target trajectory is a trajectory for the vehicle 1 to avoid an object, the autonomous driving unit 21 may select the second autonomous driving mode. For example, when the target trajectory is a trajectory along a road or a vehicle line shape, the autonomous driving unit 21 may select the first automatic driving mode. The first autonomous driving mode is referred to as "Hands Off driving support" as appropriate.

The image acquisition unit 22, the state detection unit 23, the determination unit 24, and the notification unit 25 will be described with reference to the flowchart of FIG. 2. In FIG. 2, the determination unit 24 determines whether or not the autonomous driving mode of the vehicle 1 is the first autonomous driving mode (that is, Hands Off driving support) (S101). In S101 process, when it is determined that the autonomous driving mode is not the first autonomous driving mode or is not the autonomous driving (i.e., is the manual driving) (S101: No), the operation illustrated in FIG. 2 is ended. Thereafter, S101 may be processed again. That is, the operation illustrated in FIG. 2 may be repeatedly performed at a predetermined cycle.

In S101 process, when it is determined that the autonomous driving mode is the first autonomous driving mode (S101: Yes), the image acquisition unit 22 acquires an image including the occupant of the vehicle 1 captured by the in-vehicle camera 11 (in other words, an image in which the occupant is captured). The state detection unit 23 detects the state of the occupant by performing an image recognizing process on the image acquired by the image acquisition unit 22 (S102).

The determination unit 24 determines whether or not the state of the occupant detected by the state detection unit 23 is a state in which both hands are blocked (S103). Here, "a state in which both hands are blocked" means a state in which the occupant does not grip the steering wheel, and the occupant holds an object other than the steering wheel in both hands.

In S103 process, when it is determined that the occupant's state is a state in which both hands are blocked (S103: Yes), the determination unit 24 increments the counting (S104). On the other hand, in S103 process, when it is determined that the occupant's condition is not a condition in which both hands are blocked (S103: No), the determination unit 24 resets the counting (S105). Thereafter, S102 is processed.

After S104, the determination unit 24 determines whether or not the counting is equal to or greater than the upper limit (S106). In S106 process, when it is determined that the counting is less than the upper limit (S106: No), S102 process is executed.

In S106 process, when it is determined that the counting is equal to or larger than the upper limit (S106: Yes), the notification unit 25 alerts the occupant (S107). For example, the notification unit 25 may give an alert by displaying a message such as "Do not continue to block both hands" on at least one of the displays 13 and 14. For example, the notification unit 25 may give an alert by displaying an image indicating that both hands are to be opened on at least one of the displays 13 and 14. Note that the notification unit 25 may give an alert by displaying a message on one of the displays 13 and 14 and displaying an image on the other of the displays 13 and 14.

In parallel with S107 process, the determination unit 24 determines whether or not the first autonomous driving mode (that is, Hands Off driving support) has been terminated (S108). In S108 process, when it is determined that the first autonomous driving mode is ended (S108: Yes), the process illustrated in FIG. 2 is ended. Thereafter, S101 may be processed again. In S108 process, when it is determined that the first autonomous driving mode is not ended (S108: No), S102 process is executed.

Technical Effect

When the vehicle 1 is in the automatic driving mode and the automatic driving mode is the first automatic driving mode, the occupant of the vehicle 1 may not grip the steering wheel. However, even when the vehicle 1 is being driven automatically, there is a possibility that the occupant has to operate the vehicle 1 at once. For this reason, it should be avoided from the viewpoint of safety that the occupant cannot grasp the steering wheel immediately but continues for a relatively long time.

In the driving support device 20, when the vehicle 1 is automatically driven in the first automatic driving mode and the count increased due to the occupant's hands being blocked becomes equal to or greater than the upper limit value, the notification unit 25 gives an alert. Here, in the operation illustrated in FIG. 2, S102 and subsequent loops may be executed at a cycle corresponding to the imaging cycle of the in-vehicle camera 11. For this reason, when the count is equal to or larger than the upper limit value, this means a case where both hands of the occupant are blocked for a certain amount of time. For example, when the loop is executed at a cycle of 500 milliseconds and the upper limit value is 10, the count becomes equal to or greater than the upper limit value when the occupant's hands remain blocked for 5 seconds or more.

According to the driving support device 20, since the warning is made as described above, it is possible to suppress the occupant from immediately gripping the steering wheel from continuing for a relatively long time. As a result, it is possible to suppress the occurrence of a delay in the operation of the occupant when a situation occurs in which the occupant needs to operate the vehicle 1 at once while the vehicle 1 is being driven automatically. That is, according to the driving support device 20, it is possible to suppress the occurrence of a situation in which the grip of the steering wheel of the occupant is delayed when necessary.

Modification

The above-described upper limit value may change in accordance with the speed of the vehicle 1. For example, when an object falls from a vehicle traveling in front of the vehicle 1, if the speed of the vehicle 1 is relatively small, the time allowance until the vehicle 1 reaches the fallen object is relatively long. On the other hand, if the speed of the vehicle 1 is relatively large, the time allowance until the vehicle 1 reaches the falling object is relatively short. Therefore, the upper limit value in the case where the speed of the vehicle 1 is a relatively slow first speed may be larger than the upper limit value in the case where the speed of the vehicle 1 is a second speed larger than the first speed.

An operation according to a modification of the driving support device 20 will be described with reference to a flowchart of FIG. 3. In FIG. 3, when it is determined that the autonomous driving mode is the first autonomous driving mode (S101: Yes), the determination unit 24 acquires the speed of the vehicle 1 based on the output of the speed sensor 12. The determination unit 24 determines whether or not the speed of the vehicle 1 is a low speed (S201).

In S201 process, when it is determined that the speed of the vehicle 1 is the low speed (S201: Yes), the determination unit 24 sets the upper limit value to the value UL1 (S202). On the other hand, in S201 process, when it is determined that the speed of the vehicle 1 is not the low speed (S201: No), the determination unit 24 sets the upper limit value to the value UL2 (S203). Here, the value UL1 is larger than the value UL2.

In S201 process, the reference value (or threshold value) for determining whether or not the speed of the vehicle 1 is a low speed may be a fixed value or may be a variable value that varies according to the type of the road (for example, an expressway or a highway). For example, when the reference value is a variable value, the reference value may be the following value. If the type of road is an expressway, the reference value may be 40 kilometers per hour. If the type of road is a highway, the reference value may be 30 kilometers per hour. If the type of road is neither an expressway nor a highway, the reference value may be 20 kilometers per hour.

Aspects of the disclosure derived from the above-described embodiments and modifications are described below.

A driving support device according to an aspect of the present disclosure includes an image acquisition unit that acquires an image including an occupant riding on a vehicle, a state detection unit that detects a state of the occupant based on the image, and a notification unit that notifies the occupant when the detected state is a state in which the occupant holds an object in both hands for a predetermined time in a mode in which grasping of a steering wheel of the vehicle is unnecessary and the vehicle is automatically driven.

In the above-described embodiment, the "image acquisition unit 22" corresponds to an example of the "image acquisition unit", the "state detection unit 23" corresponds to an example of the "state detection unit", and the "notification unit 25" corresponds to an example of the "notification unit". In the above-described embodiment, the "first autonomous driving mode" corresponds to an example of the "mode in which the steering wheel of the vehicle is not required to be gripped", and the "case in which the count is equal to or larger than the upper limit value" corresponds to an example of the "case in which the occupant is in a state of holding the object in both hands for a predetermined time".

The predetermined time may vary according to a speed of the vehicle. In this case, the predetermined time period when the speed of the vehicle is the first speed may be longer than the predetermined time period when the speed of the vehicle is the second speed higher than the first speed.

The vehicle may include a first display device and a second display device visible to the occupant. When the detected state is a state in which the occupant holds an object in both hands for the predetermined time in a mode in which the steering wheel does not need to be gripped and the vehicle is being driven automatically, the notification unit may display information on both the first display device and the second display device to perform the notification.

The present disclosure is not limited to the above-described embodiments, and can be modified as appropriate within the scope and spirit of the disclosure that can be read from the claims and the entire specification, and a driving support device with such a change is also included in the technical scope of the present disclosure.

What is claimed is:

1. A driving support device installed in a vehicle, the vehicle comprising a camera, a speed sensor configured to detect a vehicle speed, and a display, the driving support device comprising a control circuit configured to:
   i) execute autonomous driving in either a first mode in which a vehicle occupant is not required to hold a steering wheel, or a second mode in which the vehicle occupant is required to hold the steering wheel;
   ii) determine whether the vehicle is operating in the first mode;
   iii) acquire the vehicle speed from the speed sensor in a case where the vehicle is operating in the first mode;
   iv) determine whether the acquired vehicle speed is equal to or less than a predetermined speed;
   set a count upper limit to a first value in a case where the vehicle speed is less than the predetermined speed, and set the count upper limit to a second value in a case where the vehicle speed is equal to or greater than the predetermined speed, the first value being greater than the second value;
   vi) acquire an image of the vehicle occupant captured by the camera;
   vii) perform image recognizing process on the acquired image;
   viii) determine whether the vehicle occupant is holding objects in both hands based on the processed image;
   ix) increase a count by one in a case where the vehicle occupant is holding the objects in both hands;
   x) determine whether the count exceeds the count upper limit; and
   xi) display a message or a figure on the display to notify the vehicle occupant that the vehicle occupant should free both hands in a case where the count exceeds the count upper limit, wherein
   in a case where the count does not exceed the count upper limit, the control circuit is configured to repeat the vi) to x) at a predetermined cycle until the count exceeds the count upper limit,
   in a case where a road on which the vehicle is traveling is an expressway, the predetermined speed is 40 kilometers per hour,
   in a case where a road on which the vehicle is traveling is a highway, the predetermined speed is 30 kilometers per hour, and
   in a case where a road on which the vehicle is traveling is neither an expressway nor a highway, the predetermined speed is 20 kilometers per hour.

2. The driving support device according to claim 1, wherein
   the display comprises a first display provided in an instrument panel and a second display which is a head-up display, and
   the control circuit is configured to display the image on one of the first display and the second display, and to display the message on one of the first display and the second display that does not display the image.

3. The driving support device according to claim 1, wherein
   during execution of xi), the control circuit is configured to further determine whether the vehicle is operating in the first mode, and
   the control circuit is configured to stop displaying the message or the figure on the display in a case where the vehicle is not operating in the first mode.

4. The driving support device according to claim 1, wherein
   the predetermined cycle to repeat the vi) to x) is 500 milliseconds, and
   either the first value or the second value of the count upper limit is set to 10.

5. The driving support device according to claim 1, wherein
   the predetermined cycle to repeat the vi) to x) corresponds to an imaging cycle of the camera.

* * * * *